Oct. 6, 1936.  W. N. OWENS  2,056,865
BROODER
Filed Dec. 4, 1934  2 Sheets-Sheet 1

William N. Owens
INVENTOR
BY Victor J. Evans & Co.
ATTORNEY

Oct. 6, 1936.  W. N. OWENS  2,056,865
BROODER
Filed Dec. 4, 1934  2 Sheets-Sheet 2

William N. Owens
INVENTOR

BY Victor J. Evans & Co.
ATTORNEY

Patented Oct. 6, 1936

2,056,865

UNITED STATES PATENT OFFICE 2,056,865

BROODER

William N. Owens, Bedford, Ind.

Application December 4, 1934, Serial No. 755,963

2 Claims. (Cl. 119—33)

The invention relates to a brooder and more especially to an electrically heated and lighted brooder.

The primary object of the invention is the provision of a brooder of this character, wherein the body thereof is divided into a run chamber and a hover or rest chamber, these being in communication with each other by an opening covered by a curtain, while arranged in the hover or rest chamber is a heating pipe having fitted therein an electric bulb which furnishes heat and light, a greater portion of the light being admitted to the run chamber while a small portion will be delivered to the hover or rest chamber and the light to the run chamber can be closed off, there being a manually operable slide for this purpose, the brooder in its entirety being of novel construction.

Another object of the invention is the provision of a brooder of this character, wherein the sides and one end of the run chamber are fitted with adjustable plates to provide the proper sized opening for permitting chicks within the run chamber to acquire feed as contained within troughs removably fitted exteriorly of the body of the brooder and this is advantageous by reason of the growth of the chicks as confined within the brooder.

A further object of the invention is the provision of a brooder of this character, wherein both the run chamber and the hover or rest chamber are fitted with wire mesh floors and trays are slidably fitted in the body of the brooder, and in this manner the latter is rendered thoroughly sanitary as the trays can be removed for cleaning purposes.

A further object of the invention is the provision of a brooder of this character which is simple in construction, thoroughly reliable and efficacious in its purposes, economical in the working thereof, strong, durable, and inexpensive to manufacture.

With these and other objects in view, the invention consists in the features of construction, combination and arrangement of parts as will be hereinafter more fully described in detail, illustrated in the accompanying drawings, which disclose the preferred embodiment of the invention, and pointed out in the claims hereunto appended.

In the accompanying drawings.

Similar reference characters indicate corresponding parts throughout the several views in the drawings.

Figure 1:
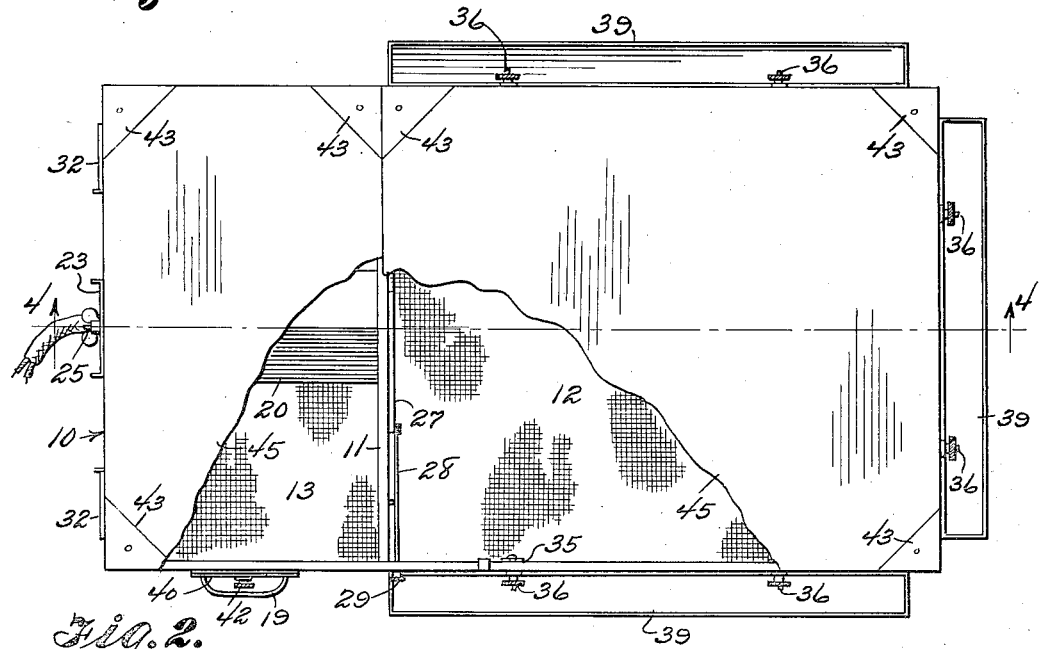
Figure 1 is a top plan view of the brooder constructed in accordance with the invention and the same being partly broken away at its top.
Figure 2:
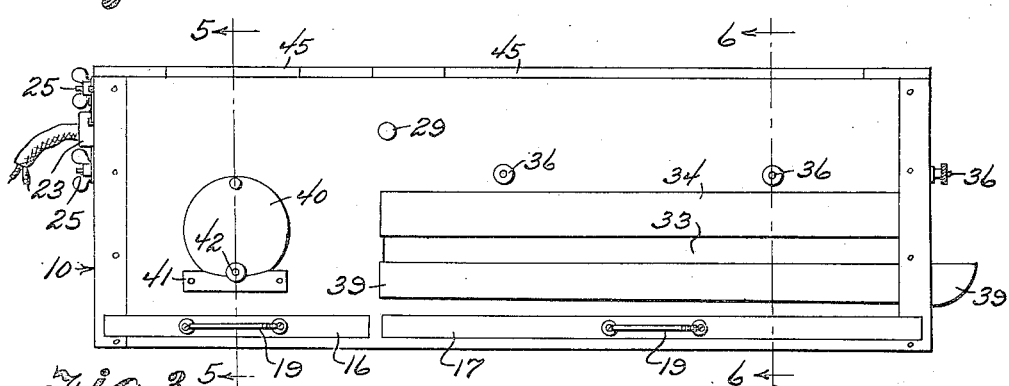
Figure 2 is a side elevation.
Figure 3:
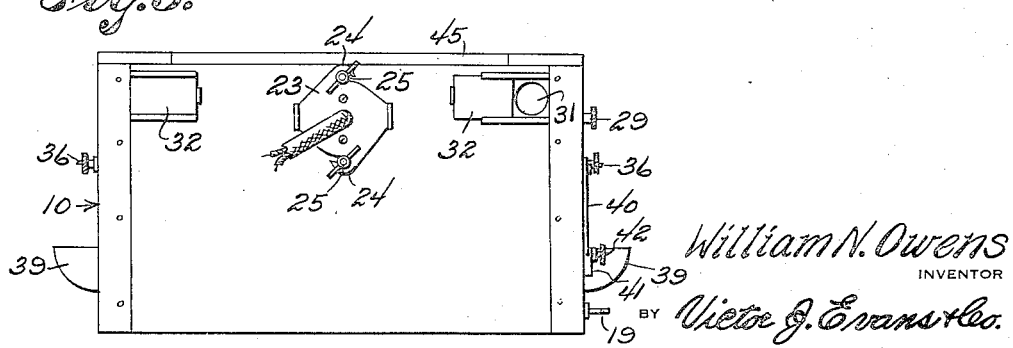
Figure 3 is an end elevation.
Figure 4:
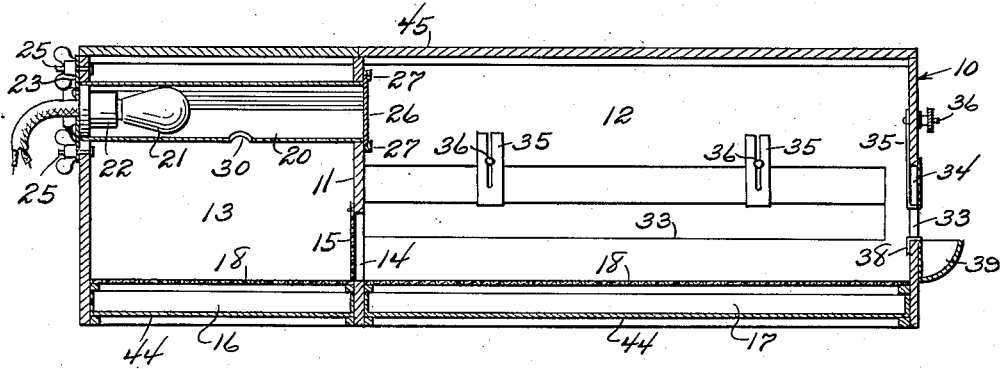
Figure 4 is a sectional view on the line 4—4 of Figure 1 looking in the direction of the arrows.
Figure 5:
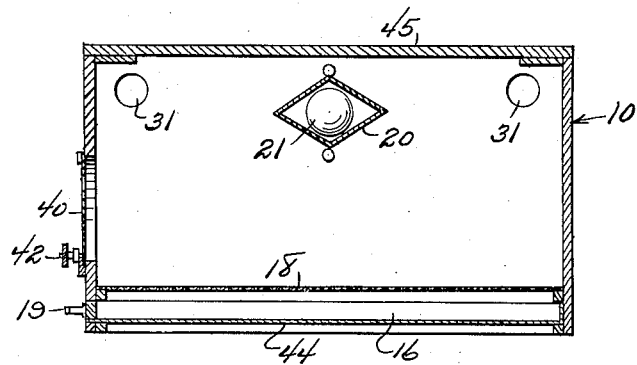
Figure 5 is a sectional view on the line 5—5 of Figure 2 looking in the direction of the arrows.
Figure 6:
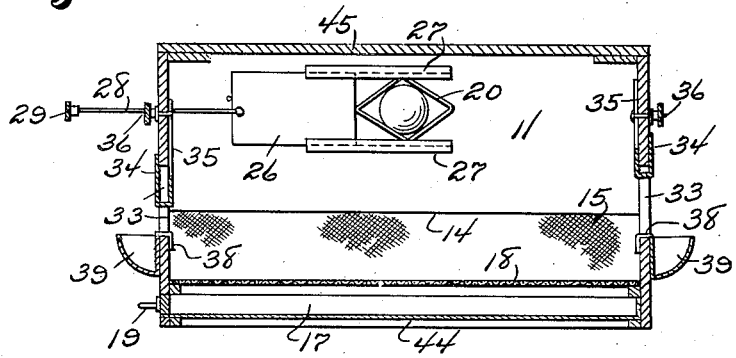
Figure 6 is a sectional view on the line 6—6 of Figure 2 looking in the direction of the arrows.

Referring to the drawings in detail, the brooder constituting the present invention comprises a substantially rectangular-shaped body 10 having therein a vertical partition 11 which is disposed transversely of the body and divides the interior thereof into a run chamber 12 and a hover or rest chamber 13, these being in communication with each other through an opening 14 which is of an extent corresponding to the width of the chambers so that chicks within the body can move from one chamber to the other with freedom. The opening 14 is closed by a fabric curtain 15 susceptible of being displaced by the chicks so that they may pass from one chamber to the other without a barrier.

Slidably fitted in the body 10 at the lowermost portions of the chambers 12 and 13 are the drawer-like trays 16 and 17, respectively, there being wire mesh floors 18 for the said chambers and each tray carries a handle 19 for convenience in the sliding of the trays into and from the said chamber.

Arranged in the chamber 13 and suitably supported is a horizontally disposed heating pipe 20 preferably of diamond shape in cross section and its inner end opening into the run chamber 12 and its opposite outer end opening exteriorly of the body 10. Receivable in the pipe 20 is an electric light bulb 21, its fitting 22 being carried upon a plate 23 formed with the jaws 24 to engage with winged nut-carrying bolts 25, these being held in the end wall of the body 10 and in this manner the said plate 23 can be detached for the removal of the bulb 21 from the pipe 20. The bulb 21, when lighted, provides heat for the pipe 20 and also light to be projected into the run chamber 12 through the inner open end of said pipe, which open end can be closed by a shutter or slide 26 fitted in guides 27. The shutter or slide 26 is fitted with an operating rod 28 slidably mounted in the body 10 and at its outer end carries a hand knob 29 so that it can be manually manipulated to move the slide or shutter to opening or closing position and when in closed position will shut off light and heat from the run chamber 12.

The pipe 20 has a bottom opening 30 which will cast a pilot light into the hover or rest chamber 13 from the bulb 21 when lighted. The pipe 20 furnishes heat to said hover or rest chamber 13, as will be apparent.

Provided in the end wall to the hover or rest chamber 13 are vent openings 31, these being normally closed by hand operable slides 32 and their purpose being to permit ventilation within said hover or rest chamber.

Provided in the sides and the outer end wall of the chamber 12 are horizontally disposed relatively large openings 33, these being confronted by slide plates 34 having the slotted arms 35 for the fitting of set screws 36 with said arms, the screws 36 being passed through the body 10. On adjustment of these slide plates the size of the openings 33 can be varied according to the size of the chicks and such openings 33 constitute feeding slots.

Engaged with the lower horizontal edges of the openings 33 are the hangers 38 for feed troughs 39, these being readily removable for the filling or cleaning thereof, as should be apparent.

Provided in one side of the body 10 is a suitable entrance normally closed by a swinging gate 40, the entrance opening into the hover or rest chamber 13. The gate 40, when closed, engages a keeper 41 on the body 10 and is provided with a finger hold or grip 42, as usual.

The slide plates 34 play against the outer faces of the sides and end wall of the chamber 12.

The corners at the top of the body 10 are fitted with corner reinforcements 43.

The trays 17 are provided with solid or closed bottoms 44 and receive the droppings from the chicks through the floor 18. The brooder in its construction assures thorough sanitation and will be heated and lighted from the bulb 21 as hereinbefore indicated. The chicks are introduced through the entrance by opening the gate 40, as will be obvious.

The top 45 of the body 10 can be mounted for removal to permit free access to either the chamber 12 or 13 within the body.

What is claimed is:

1. A brooder of the character described comprising a body having a vertical partition therein dividing it into communicating chambers, a heating pipe arranged within one chamber, an electric light bulb fitted within said pipe, said pipe being constructed to project a greater amount of light from the bulb to one chamber and a smaller amount of light to the other, manually operable means for shutting off the greater amount of light, means for removably fitting the electric light bulb in the pipe, and trays slidably fitted in said chambers.

2. A brooder of the character described having communicating chambers, a heater casing arranged within one chamber, an electric light bulb fitted within said heater casing, said heater casing being constructed to project a greater amount of light from the bulb to one chamber and a smaller amount of light to the other chamber, manually operable means for shutting off the greater amount of light, a closure at the point of communication of said chambers, means for removably holding the electric light bulb in said heater casing, feeder means accessible to one of said chambers, and trays slidably fitted in said chambers.

WILLIAM N. OWENS.